Patented Jan. 8, 1929.

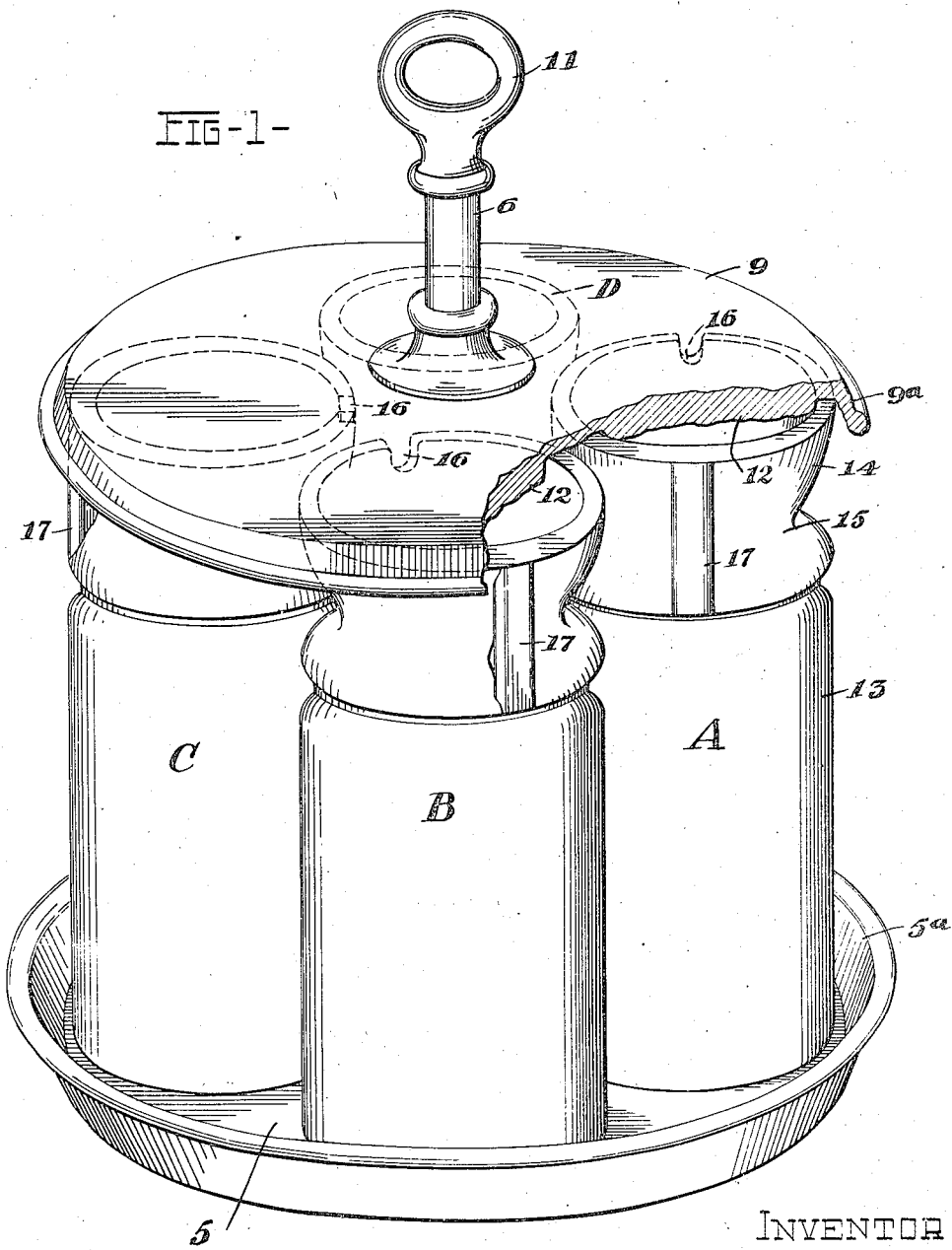

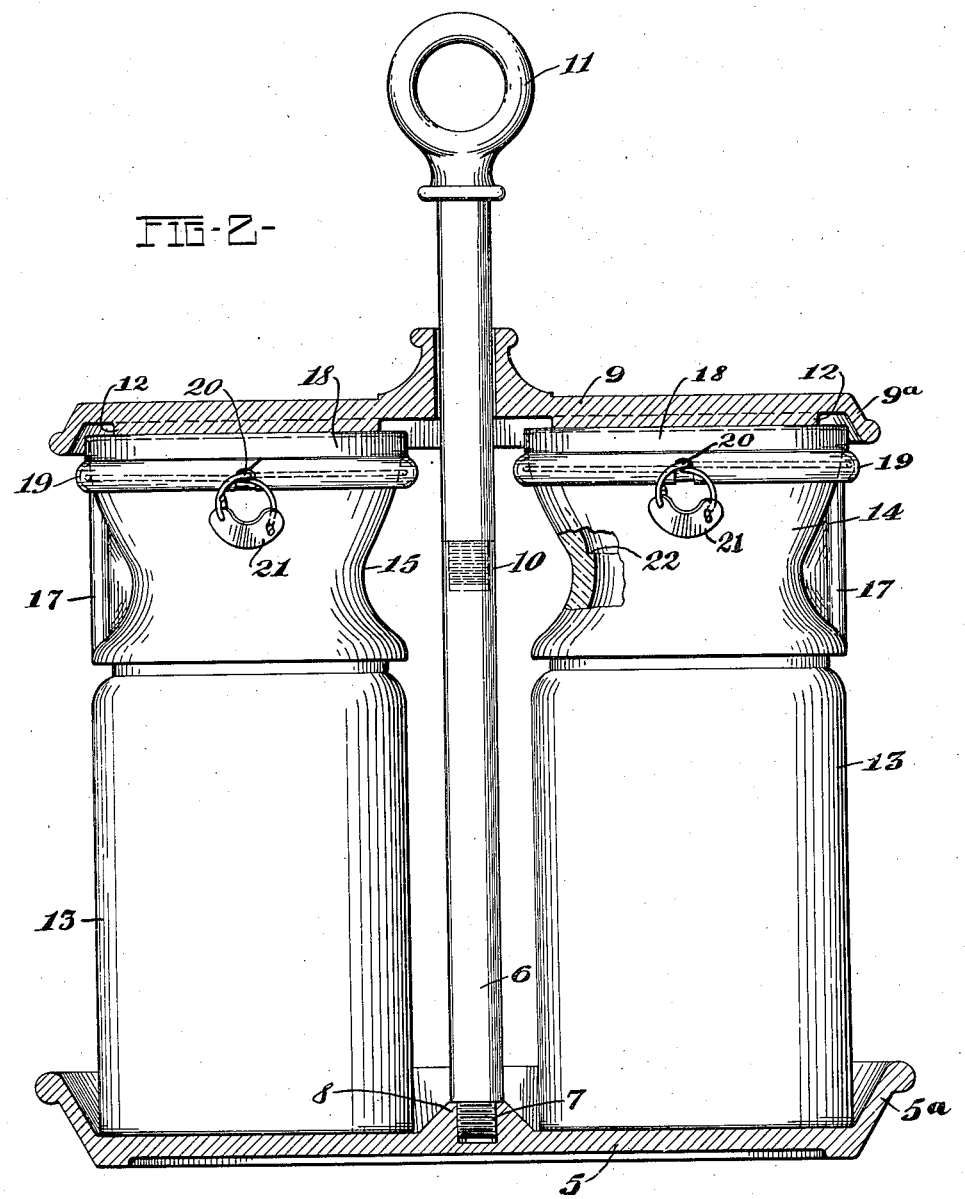

1,698,489

UNITED STATES PATENT OFFICE.

FREDERICK E. BICKFORD, OF ROCHESTER, NEW YORK.

CONTAINER.

Application filed June 30, 1926. Serial No. 119,654.

My invention relates to a method and equipment for supplying in convenient form for daily use, along with other foods, a variety of food products particularly selected with respect to their vitamin content and which when partaken of daily, will insure an adequate and balanced supply of the vitamins essential to health.

At the present day, it is recognized that the various vitamins are an important part of a balanced and normal food supply and are essential to health and growth of the body. It is also a well recognized fact that the vitamins present in many foods in their normal state, are in a large measure removed or destroyed by the conventional methods of processing and preparing the food products for market. With other articles or products used for food, the vitamins are to a large extent removed or destroyed by the usual methods of cooking and preparing the foods for eating. It is also a fact that the average person exercises little or no intelligence in the selection of food from the standpoint of health, his selection of food being governed rather by its appeal to his palate. As a result, the conventional American diet is generally lacking in its supply of the essential vitamins. Even where this deficiency is recognized, it is not always convenient or practical to obtain daily a variety of foods which will adequately supply the deficiency.

An object of the present invention is to provide a convenient and practical method and means of supplying this deficiency in a manner that will appeal to the average person and which may be used without requiring any technical knowledge of the vitamins and vitamin requirements of a balanced food ration. To this end, I have provided a group of containers each supplied with a different food product in the form of a relish or the like, in each of which one of the vitamins predominates. This group of containers is supported in a tableware piece or caster adapted to be kept on the table, so that a person can readily and conveniently partake daily of the contents of each container, and thereby obtain a complete and balanced supply of the vitamins in his daily food supply.

Other objects of the invention will appear more fully hereinafter.

In the accompanying drawings:

Figure 1 is a perspective view of a caster or holder with a group of containers therein for the several food products.

Figure 2 is a sectional elevation of the same, also showing the individual covers or caps with which the containers are sealed when filled with the original food contents.

A group of containers such as A, B, C and D are adapted to be supported in a holder or caster comprising a bottom support or tray 5, a central vertical shaft or stem 6 having its lower end 7 threaded into a central boss 8 formed on the tray, and a cover 9 mounted to slide up and down on the stem 6. The holder may be made of glass, metal or other suitable material. The stem is preferably made in sections having a telescoping screw threaded connection 10, permitting said stem to be taken apart for compact packing. A handle 11 in the form of a ring is provided at the upper end of the stem. The under face of the cover 9 may be provided with circular bosses 12 of a suitable size to project downward into the open mouths of the containers, thereby closing the containers and holding them in spaced relation and symmetrically arranged around the stem 6. The base 5 is provided with an upwardly flared peripheral flange 5ª and the cover 9 is formed with a downwardly directed flange 9ª, said flanges assisting in protecting and holding the containers in position.

The containers are preferably alike in construction. As shown, each comprises a substantially cylindrical body portion 13 above which is a top portion 14, inwardly curved in outline to provide a more or less restricted neck 15. The upper edge or lip of the container is formed with a spout opening 16. Opposite the spout 16 is a handle 17. It will thus be seen that the container is in the form of a pitcher adapted for pouring liquid contents therefrom. When the container is originally filled with a food product it is closed by an individual cap 18 comprising a top cover portion and a depending flange, the lower portion of which is formed into a bead 19 providing an annular space to receive a sealing gasket. A wire 20 is embedded in the ring gasket, the ends of the wire being crossed and extended downward below the bead. The ends of the wire are connected by a seal 21 having a loose connection with one of said wire ends, so that by grasping the seal and pulling it, said loose connection is broken and the wire with the sealing gasket may be withdrawn downward from the bead 19, thereby unsealing the cover and permitting its removal from the container. After being thus unsealed, the individual caps 18 may be used as temporary closures for the containers, or may be discarded, if preferred. When discarded, the cover plate 9 serves as a closure for all the containers, as hereinbefore noted. The construction of the container, its cap and the sealing means is more fully set forth and claimed in my Patent Number 1,684,938, dated September 18, 1928.

Each container is preferably supplied with a food product particularly selected with reference to its vitamin content. These products may consist of relishes such as are ordinarily taken along with other foods. The container A, for example, may be packed with a food product containing, predominantly, vitamin A, as for instance, a tomato product. The container B may in like manner be filled with a product containing, predominantly, vitamin B, as for example, a fruit conserve. The container C may contain a food product comprising, predominantly, vitamin C, as for example, a relish comprising a sauerkraut base. The container D may be supplied with a product containing, for example, a vitamin D, or, if preferred, a product such as milk, containing as it does, all of the vitamins.

This group of containers with the several vitamin food products is conveniently retained in the caster or holder, and when placed on the table, provides a convenient means for supplying the vitamins which are an essential part of a normal food supply. By partaking daily of the contents of each of the containers, one is assured of obtaining a complete and balanced vitamin supply, regardless of any deficiency in his other foods. After the contents of a container have been used up, it may be replaced by a filled container which has been freshly unsealed. The empty container may then be used for other purposes. In the form shown, it is well adapted, for example, for use as a milk bottle. To permit it to be used for this purpose, the container is formed on its interior surface, preferably at the neck 15, with an annular shoulder 22, to form a seat for a disk cover or cap such as is ordinarily used for a milk bottle closure.

Modifications may be resorted to within the spirit and scope of my invention.

What I claim is:

1. A table caster or receptacle holder comprising a base forming a support for a plurality of receptacles, a central stem secured to and rising from the base, a handle at the upper end of said stem, and a cover piece mounted on said stem and free to slide up and down thereon and forming a closure for the receptacles, said cover piece being in the form of a flat disk formed on its under face with circular bosses or extensions projecting downwardly therefrom to enter the open upper ends of the receptacles, the cover piece being held by its weight in position to close the receptacles and free to be lifted off the receptacles.

2. A receptacle holder or caster comprising a substantially flat base forming a support for a plurality of food containers, said base having a pheripheral flange portion flared upwardly and outwardly from the floor of the base, a vertical rod removably secured to the center of the base and extending upwardly therefrom, said rod comprising separable sections and formed at its upper end with a handle, and a cover plate slidably mounted on the rod for free vertical movement and normally supported on the containers, said cover plate having on its under face, circular bosses symmetrically arranged about its axis, said cover plate being formed with a peripheral flange downwardly and outwardly flared from said under face.

3. The combination of a group of containers for food products, a holder therefor comprising a base plate, a central stem rising therefrom, and a cover plate mounted on the stem and free for vertical sliding movement thereon and arranged to be supported on the containers and from a closure therefor, said cover plate having its under surface formed with integral bosses of a size and shape to enter and approximately fill the open ends of the containers and positioned to hold the containers in laterally spaced position and symmetrically arranged about said stem.

Signed at New York, in the county of New York and State of New York, this 21st day of June, 1926.

FREDERICK E. BICKFORD.